United States Patent [19]

Muller

[11] 3,903,318

[45] Sept. 2, 1975

[54] PROCESSES FOR IMPROVING THE WETTABILITY AND ADHESIVENESS OF PLASTIC SURFACES USED AS SUBSTRATES IN TISSUE CULTURE

[76] Inventor: Hans Muller, Im Almendli, Erlenbach, Zurich, Switzerland

[22] Filed: July 13, 1973

[21] Appl. No.: 379,110

[30] Foreign Application Priority Data

July 18, 1972 Switzerland........................ 10841/72

[52] U.S. Cl. .................... 427/2; 427/307; 427/322; 427/354
[51] Int. Cl.² ......................................... B44D 1/092
[58] Field of Search............ 117/47 A, 118, 138.8 R, 117/169 A

[56] References Cited
UNITED STATES PATENTS

| | | | |
|---|---|---|---|
| 3,132,983 | 5/1964 | Osborne et al. .................. | 117/47 A |
| 3,445,350 | 5/1969 | Klinger et al. .................... | 117/47 A |
| 3,565,675 | 2/1971 | Sams............................... | 117/169 A |
| 3,645,779 | 2/1972 | Kienel............................. | 117/169 A |

*Primary Examiner*—William D. Martin
*Assistant Examiner*—Janyce A. Bell
*Attorney, Agent, or Firm*—Michael S. Striker

[57] ABSTRACT

A process for improving the wettability of the surface of a polycarbonate plastic substrate for use in tissue culture which comprises immersing the plastic substrate in acetone or ethyl acetate and subsequently washing and drying the thus-treated substrate. The substrate may be further coated with a silica gel by immersing it in a solution of sodium silicate followed by subsequent immersion in an acid, washing with water, and drying the same.

1 Claim, No Drawings

PROCESSES FOR IMPROVING THE WETTABILITY AND ADHESIVENESS OF PLASTIC SURFACES USED AS SUBSTRATES IN TISSUE CULTURE

BACKGROUND OF THE INVENTION

This invention pertains to processes for improving the wettability and adhesiveness of surfaces of plastics that are used as substrates in the culturing of tissue cells. In culturing cells that were removed from a tissue, especially for the production of vaccines, such as a vaccine against foot-and-mouth disease (aphthous fever), apparatus is used which presents a flat surface to the growing cells. It has been found that such a flat substrate is required to grow the cells in a single layer, a so-called "monolayer," because in this manner a degeneration of the diploid cells can be prevented. In large-scale production apparatus, correspondingly large surfaces are used, which alternatingly or simultaneously must be maintained in contact with nutrient liquid and air. The material of these surfaces must be wetted so that the cells can propagate thereon, while on the other hand the surfaces must be so smooth that, on harvesting the cells of the culture, the cells can be completely separated from the substrate without leaving a residue. It is thus necessary that the surface of the support or substrate be neither too smooth nor too rough and that, in all cases, the cells must suitably adhere thereto. The large-scale apparatus for such tissue culture consists, for example, of horizontal tubes, or vertical discs capable of being rotated about a horizontal axis, or more recently, spirally wound surfaces, whereas formerly horizontal surfaces arranged above each other were preferred. The latter have the advantage that the cultures during their growth do not separate from the substrate, whereas the former provide better culture conditions, especially since the performance of the wetting and aeration operations can be varied in manners suitable for growth of the cells. However, the vertical substrates have the disadvantage that the cells can slide down on the vertical surface when they insufficiently adhere to the substrate.

It has become evident that, besides the prior glass substrates, which were almost the only substrates that were used heretofore, certain plastics would be very suitable if the adhesiveness of their surfaces could be maintained within limits that are required for cell growth. In an article in Experimental Cell Research, volume 71, page 293 (1972), a method was proposed to treat polyester sheets with metasilicate and hexametaphosphate compounds. However, many otherwise suitable plastics are not affected by such water-soluble substances. Thus, for example, polycarbonate plastics which have proved to be eminently suitable and easily sterilizable substances for use as substrates for tissue culture, cannot be treated in this manner, since aqueous media do not act on or, by partial solution, roughen the surfaces thereof.

SUMMARY OF THE INVENTION

The object of the present invention is to provide a process which can be used for treating plastic substrates which are not affected by such prior treating agents but which, because of their otherwise excellent properties, are eminently suitable for use as substrates in tissue culture.

In accordance with the present invention, the foregoing object is achieved by subjecting the plastics that are useful in tissue culture to a treatment with an organic solvent.

DETAILED DESCRIPTION

In treating the plastic sheet in accordance with the process of the present invention, the sheet is immersed for a very short interval of time in a solution of an organic solvent that is completely miscible in water, such as acetone, and ethyl acetate.

Also included in the Examples which follow is a process of applying a silica gel to a plastic substrate to increase the adhesiveness of the plastic substrate.

EXAMPLE 1

A sheet of polycarbonate plastic that is suitable for use as a substrate in tissue culture was immersed in pure acetone or ethyl acetate for a period between 10 and 20 seconds. It was subsequently washed with water and dried. The plastic sheet, which was previously transparent and smooth, was changed to a milky white color and, as a result of this treatment, its surfaces were made readily susceptible to wetting by aqueous liquids.

EXAMPLE 2

The polycarbonate plastic sheet that had been treated as described in Example 1 was then immersed for a short period of time in a dilute solution of sodium silicate. It was then washed with water and subsequently immersed in a dilute solution of hydrochloric acid and washed again with water. The sodium silicate solution completely penetrated the pores that were formed in the surface of the sheet by treatment with acetone or ethylacetate and was converted, by means of the treatment with acid, to a silica gel which, after drying, proved to have very good adhesiveness.

Although the treatment of only polycarbonate plastic sheets was described in the foregoing Examples, other plastics which are not wettable by aqueous liquids or which have too little adhesiveness to be suitable for use in tissue culture can be treated in the same manner as the polycarbonate plastic sheet to increase their wettability and adhesiveness.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A process for improving the wettability of a surface of a polycarbonate plastic substrate for use in tissue culture which comprises immersing the plastic substrate in acetone or ethyl acetate, washing the thus-treated substrate with water and thereafter coating the said substrate with a silica gel by immersing it in a solution of sodium silicate followed by subsequent immersion in an acid, washing with water, and drying the same.

* * * * *